United States Patent [19]
Lind et al.

[11] Patent Number: 5,083,459
[45] Date of Patent: Jan. 28, 1992

[54] FLOW METER

[76] Inventors: Leroy R. Lind, 10038 Cedar Lake Rd., Minnetonka, Minn. 55343; Lawrence Arvidson, 705 Riviera Dr., New Brighton, Minn. 55112; John C. Bohnhoff, 4109-79th La. N., Brooklyn Park, Minn. 55443

[21] Appl. No.: 522,732

[22] Filed: May 14, 1990

[51] Int. Cl.$^5$ .............................................. G01F 1/22
[52] U.S. Cl. ......................................... 73/215; 73/200
[58] Field of Search ...................... 73/200, 215, 861.04

[56] References Cited

U.S. PATENT DOCUMENTS

| | | | |
|---|---|---|---|
| 4,346,596 | 8/1982 | Diamant et al. | 73/215 |
| 4,395,918 | 8/1983 | Wilson | 73/223 |
| 4,476,719 | 10/1984 | Millar et al. | 73/215 |

*Primary Examiner*—Herbert Goldstein
*Attorney, Agent, or Firm*—James R. Cwayna

[57] ABSTRACT

A meter for determining flow rates and total volume of fluids normally mixed with a gas and delivered with a pulsating rather than a uniform flow rate, such as milk being delivered from a milking machine. The unit includes a housing having an upper, baffled, receiving chamber which initially reduces flow velocity and a second, lower chamber, having baffles or weirs for turbulence reduction prior to passage of the fluid through a particularly designed, double tapered orifice, to a measuring chamber. Within the second chamber, air and foam is separated from the milk prior to flow measurment. A plurality of electrically operated, vertically arranged probes are provided within the measuring chamber and these probes are rapidly monitored to determine the level of milk as passed through the orifice. The pulsating but relatively laminar flow causes the liquid level to oscillate between probes and the processing of the rapidly scanned probes provides data to determine the true flow rate. A low or end-of flow indicator is provided to control the milking machine or alert an attendant as to operating condition. The unit is hydraulically designed for ease of cleaning.

16 Claims, 3 Drawing Sheets

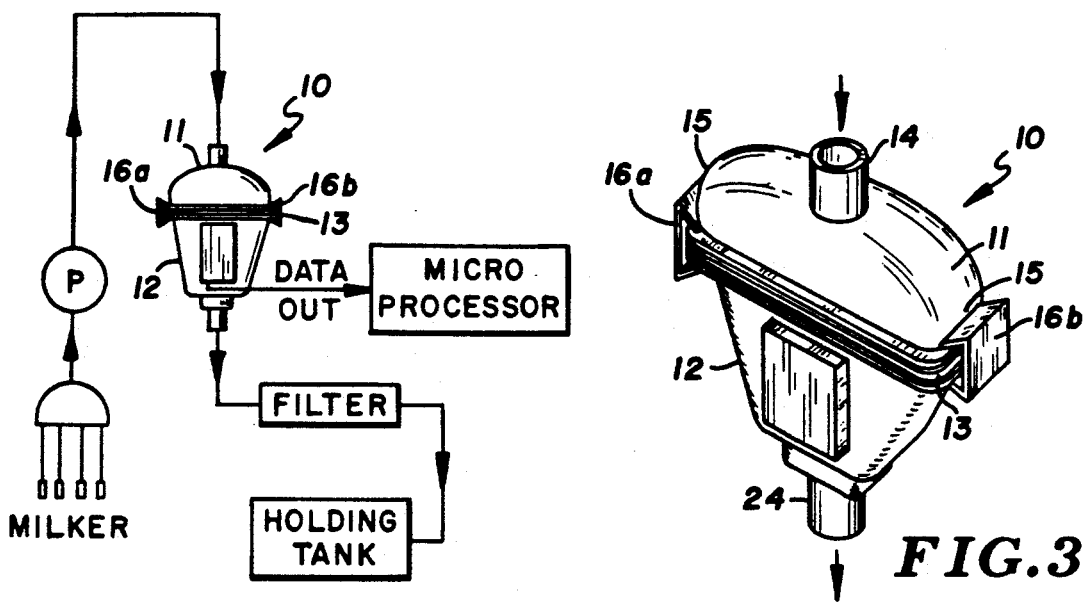
FIG.1
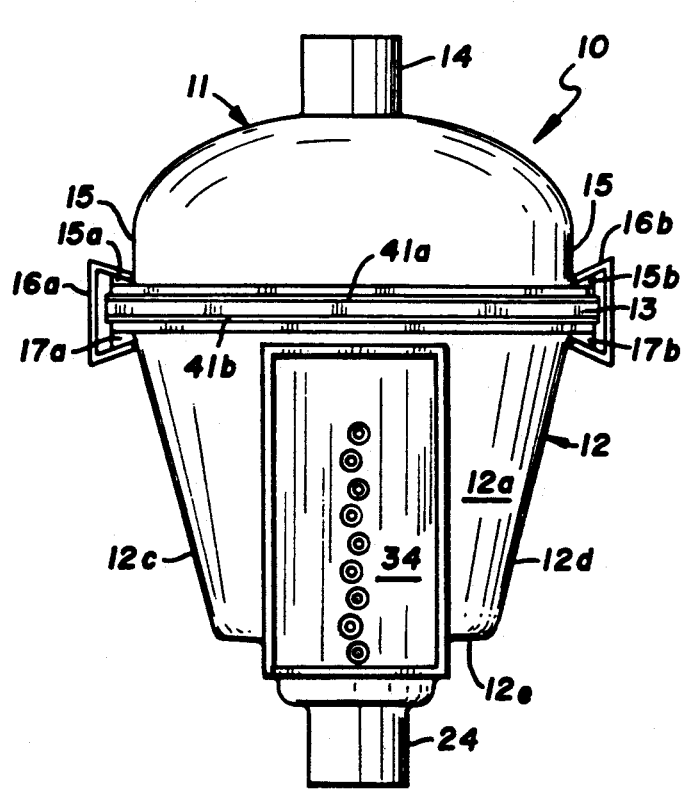
FIG.4
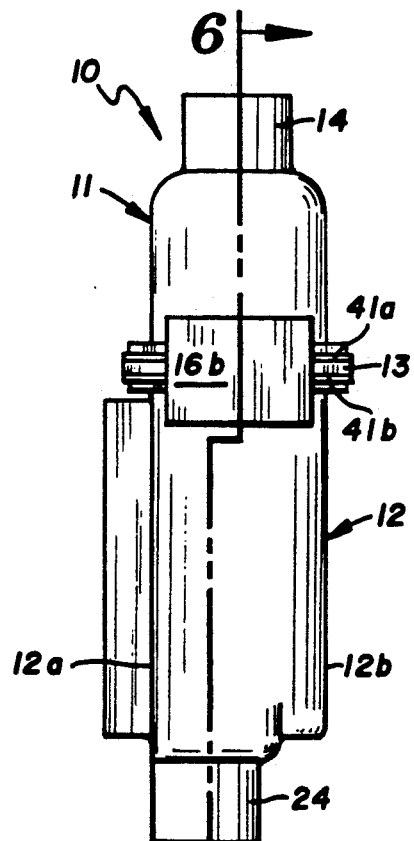
FIG.3
FIG.5

FLOW METER

FIELD OF THE INVENTION

This invention relates generally to devices for measurement of flow rates and more particularly to the determination of flow rates of gas entrapped fluids delivered in a pulsating flow.

SHORT SUMMARY OF THE INVENTION

A fluid metering device for metering of fluid flow rates of pulsating fluids which includes a multisection, separable housing having an upper, baffled receiving chamber to initially reduce the velocity of flow and aid in the separation of foam from the fluid and a lower, second, baffled chamber which reduces turbulent flow and also provides for gas separation at the upper ends of the baffles. The upper and lower chambers are easily separated for cleaning and are obviously sealed against leakage during fluid flow. A generally vertical, dual tapered knife edged outlet orifice is provided to channel the fluid from the second chamber into the measuring chamber. A plurality of generally vertically, staggered, electrically responsive probes are arranged within the measuring chamber with a lower or base probe functioning as a common probe with the probes thereabove sensing the various fluid levels at the orifice. As the fluid is delivered in pulsating condition, the number of probes immersed at any one time will fluctuate and therefore, in order to properly determine flow rate, it is essential to rapidly, monitor each of the probes with regard to a base probe. Output from the probe monitoring is, through processor technology, translated to a digital display with selective English or metric indicia of flow or weight. The probes are staggered within the measuring chamber to prevent conductive spanning when the fluid level drops between pulses and separated gas flow exiting through the chamber drys the probes and chamber walls to eliminate conductive false readings.

The separability of the upper and lower sections as well as the overall construction of the unit allows for rapid flushing an cleaning.

The microprocessor may also provide for no or end-of flow readings and control the operation of a milking machine or simply alert an attendant as to operative conditions of the unit.

BACKGROUND AND OBJECTS OF THE INVENTION

Proper financial management of a dairy herd requires proper record keeping and attendance to the productivity of cows within a herd. Milk output is an obvious indicator as to productivity and physical condition of any one cow. Therefore it has become standard operating procedure to monitor the quantity of each cow's milk delivery.

Such records are necessary for anyone wishing to operate in this field and therefore a proper measuring unit or meter must be equally operative in both parlor or stanchion conditions to accommodate the physical accommodation of the herd. Health requirements must also be considered and therefore it is necessary to provide a unit that is easily cleaned and sanitized as necessary.

Certain aspects in the measuring of pulsating fluids must be considered with the first, most obvious, being that of true flow rate determination. To accommodate this determination, pulsation or turbulence of flow must be considerably reduced prior to measurement. With the applicants' device the measuring or monitoring of the liquid takes place subsequent to reduction of such turbulence or pulsation effects.

With a turbulently flowing liquid, foam often results. Applicants' device accommodates for the separation of foam from the fluid to a true, flow rate.

It is therefore an object of the applicants' invention to provide a metering device particularly adapted for a determination of milk flow rates as delivered from a milking machine which delivers the milk in a pulsating state.

It is a further object of the applicants' invention to provide a milk metering unit which includes a first introductory chamber to receive the milk and substantially reduce the flow velocity of the milk with delivery thereof to a second baffled chamber whose baffling further assists in turbulent flow reduction an foam separation with a measuring chamber provided thereafter to measure the oscillating level of the liquid within the chamber after such flow turbulence has been substantially reduced and the foam has been substantially separated from the liquid to be measured.

It is still a further object of the applicants' invention to provide a metering device particularly adapted for the measuring of milk flow rates which includes a measuring chamber downstream from an orifice having a plurality of level monitoring probes arranged in vertical relation therein with the output of the probes, in conjunction with a first base probe, being rapidly monitored to determine the level fluctuations of the milk within the chamber at discrete times.

It is yet a further object of the applicants' invention to provide a milk metering device having a downstream measuring chamber having a plurality of vertical probes therein and having an introductory, vertically arranged, tapered orifice controlling the introduction of milk into the chamber.

It is yet a further object of the applicants' invention to provide a milk metering device and processor therefore which includes successive approximation o sequential probe monitoring techniques for gathering of fluid flow data.

It is still a further object of the applicants' invention to provide a milk metering device which provides for gas and liquid separation with the gas ultimately directed to dry the separated liquid from areas that could conduct and deliver false flow data to a data processor.

These and other objects and advantages of the applicants' invention will more fully appear from a consideration of the accompanying disclosure made in association with the provided drawings.

DESCRIPTION OF THE DRAWINGS

FIG. 1 is a flow diagram illustrating flow of and measurement of milk flow from a cow to a final holding tank;

FIG. 3 is a perspective view of the metering device embodying the concepts of the applicants' invention;

FIG. 4 is an elevation taken from one side of the metering unit;

FIG. 5 is an end elevation of the metering unit taken from FIG. 4;

DESCRIPTION OF THE PREFERRED FORM OF THE INVENTION

Figure 6:
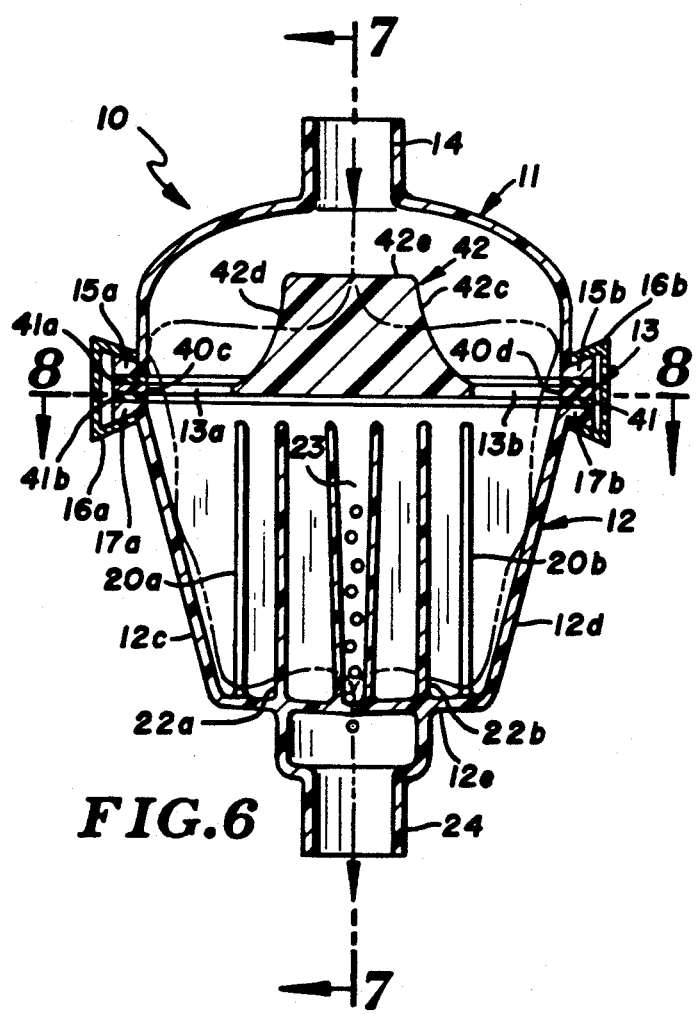
FIG. 6 is a vertical section taken substantially along Line 6—6 of FIG. 8.
Figure 7:
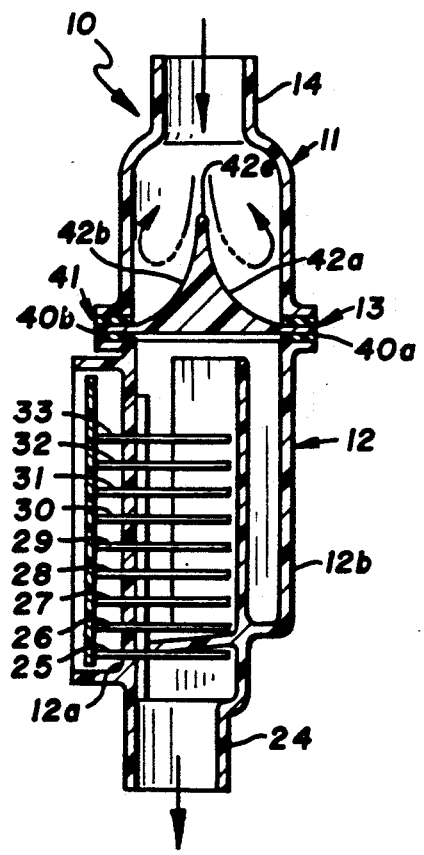
FIG. 7 is a vertical section taken substantially along Line 7—7 of FIG. 6.

In accordance with the accompanying drawings, applicants' metering device is generally designated 10 and is illustrated in operative position in the flow diagram of FIG. 1 wherein the milk is delivered from the milking unit through a pulsating pumping structure which affords the milking operation to the animal attached unit and further illustrating the output of the metering device 10 being delivered through a filter into a holding tank. Data output from the measuring probes of the unit 10 is delivered to a microprocessor where it is translated into a digital output having internal switching means for converting to metric or English display. Such digital micro-processing is well known in the art and the only consideration that is necessary with regard to such a unit that it is operable in a successive approximation or sequential mode for frequently reading the output from the various probes of the unit 10 and provide a true flow rate measurement. Such readout operations are well known in the art and it is known that the successive approximation mode decreases readout cycle time.

In accordance with the accompanying drawings applicants' metering unit 10 basically consists of a two part assembly, including an upper milk receiving, velocity reduction chamber 11 and a lower, internally baffled turbulence reduction and foam separation chamber 12 within which a measuring and discharge chamber 21 and associated probe structure 25-33 is provided, with a baffle plate 13 arranged to afford a sealable connection between the upper 11 and lower 12 chambers of the unit.

As illustrated throughout the accompanying drawings the upper chamber 11 is provided of a dome shaped, rectangular configuration having an inlet conduit 14 arranged generally centrally of the uppermost portion thereof with the downwardly depending sides to the dome providing a generally rectangular configuration to the chamber. As particularly illustrated, what may be termed the ends 15 of this rectangular configuration are provided with trapezoidal shaped ears 15a-15b to afford for rapid connection between the upper 11 and lower 12 chambers of the unit 10 through the utilization of spring clips 16a-16b which close over similar trapezoidal shaped ears 17a-17b arranged at respective ends of the uppermost area of the lower chamber 12. Obviously it is only necessary to slide the clips 16a-16b on to the ear combinations 15a-15b, 17a-17b for positive closure of the upper 11 chamber to the lower 12 chamber trapping and positively holding the baffle plate 13 therebetween.

Lower section or chamber 12 provides a housing having a front and rear side 12a-12b and ends 12c-12d extending upwardly from a formed bottom 12e with the bottom 12e having an upwardly sloping configuration, as particularly illustrated in FIG. 5, with the ends 12c-12d extending angularly upwardly to the aforementioned attachment ears 17a-17b with, of course, the front and back sides 12a-12b similarly extending upwardly to an upper, generally planar surface of the chamber 12.

Figure 8:
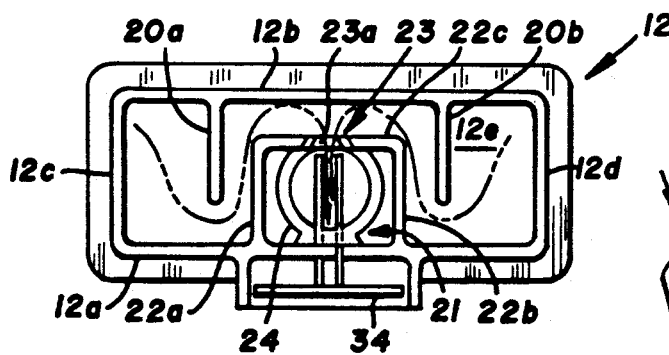
FIG. 8 is a horizontal section taken substantially along Line 8-8 of FIG. 6.

A plurality of internal baffle members, as best illustrated in FIG. 8, are vertically arranged within the lower chamber 12, and these include a first pair of baffle members 20a-20b extending inwardly from surface 12b of the lower section 12 to afford a flow path therearound as illustrated by the phantom lines of FIG. 8 with a vertically disposed metering compartment generally designated 21 arranged intermediate such baffles 20a-20b. Compartment 21 includes side elements 22a-22b extending inwardly from chamber side 12a with what may be termed a metering, slotted side 22c joining the innermost ends of the sides 22a-22b such that the baffling within the chamber is compounded, again as illustrated by the phantom lines of FIG. 8, to be around baffles 20a-20b around the frontmost surface 22c of the formed metering compartment 21 and into and through a vertically oriented flow slot or orifice 23 thereof.

The particular orifice 23 configuration is important to proper operation of the unit. As illustrated through the various views orifice 23 is upwardly tapered from lower chamber surface 12e to the uppermost ends of the baffled area and is similarly tapered inwardly from the frontal surface of side 22c to the rear thereof, as particularly illustrated in FIG. 8, to provide a knife edge opening particularly designated by reference numeral 23a. Applicants' have found that such a knife edge 23a provides a clean transition of fluid flow from a baffled portion of the lower chamber 12 into the measuring compartment 21 and that the tapered vertical shape of orifice 23 aids in proper flow rate determinations.

It should be particularly noted that all of the baffling structures arranged in lower chamber 12 terminate below the uppermost surface of chamber 12 to assist in foam, gas and liquid separation.

Located internally within the aforementioned measuring compartment 21 is discharge conduit 24 and located adjacent this discharge conduit 24 is a first or base probe 25 which serves as a reference probe from which the conductivity between a plurality of upwardly arranged and spaced probes 26 through 33 is determined. As particularly illustrated in FIG. 9 the probes 25-33 are arranged in staggered fashion to reduce the chance of spanning between probes during level rises and drops due to pulsation. Utilization of vertically spaced probes to determine level is, of course, known in the art but the aspect of staggering to prevent conductive spanning is of particular import when pulsation attributes to oscillation of fluid levels.

Figure 9:
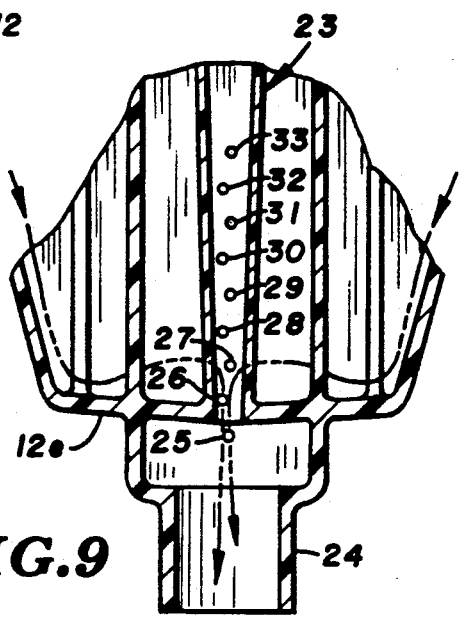
FIG. 9 is an enlarged view of a portion of FIG. 6 particularly illustrating the probe offset arrangement and discharge area of the metering unit; and, FIG. 10 is a block, schematic diagram illustrating a selected operative, control and readout arrangement of various elements for the operation of the metering unit.
Figure 10:
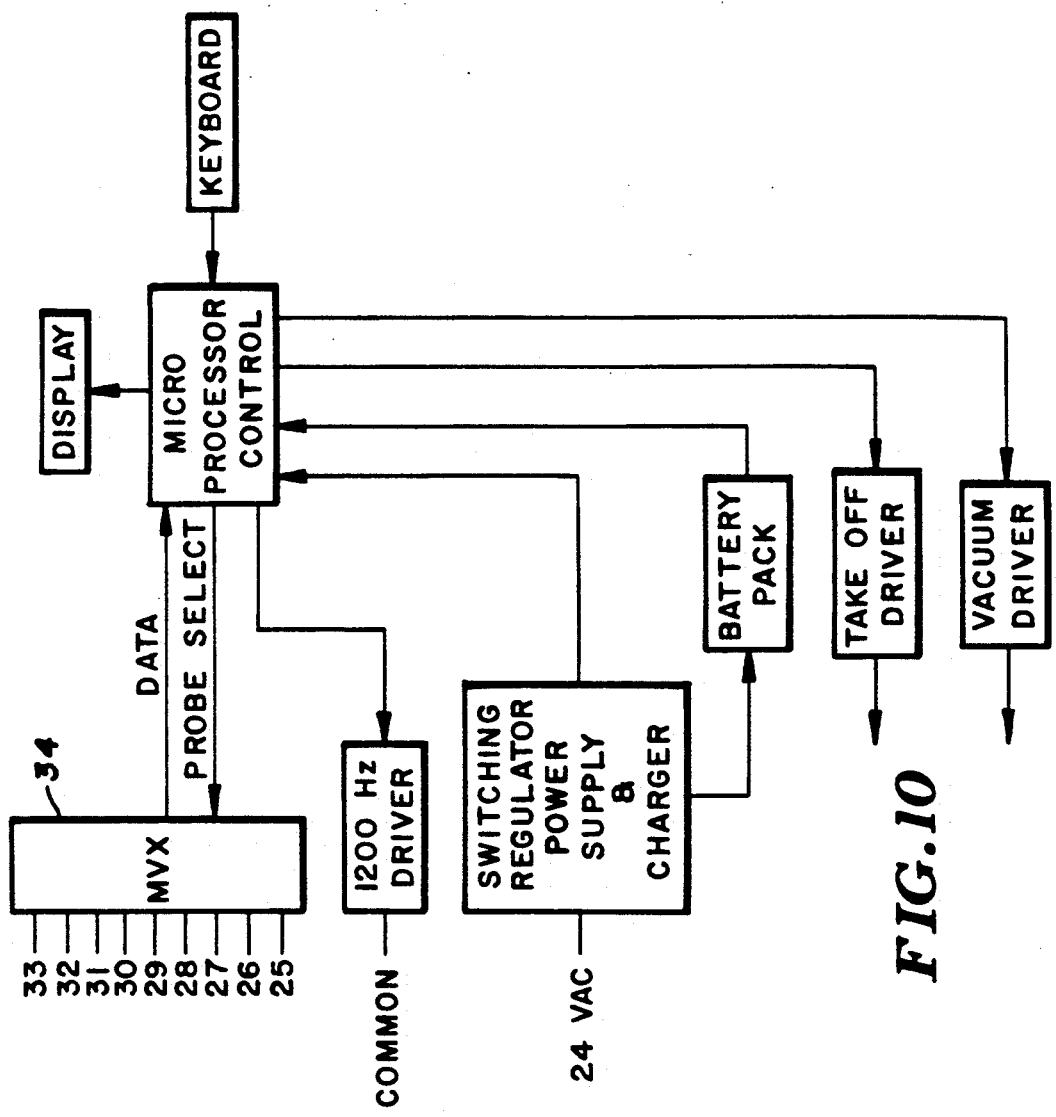
Figure 2:
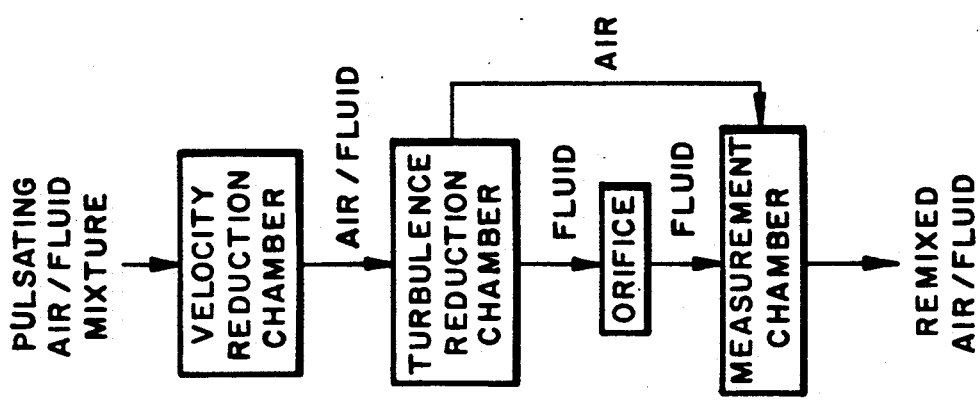
FIG. 2 is a flow diagram taken through flow of milk with the applicants' metering device.

Probes 25-33 sealingly extend through side 12a of the lower housing 12 where they are integrated to a circuit board or other connective device for ultimate connection to the micro-processor control arrangement as illustrated in FIG. 9.

Baffle plate 13, interposed between the upper 11 and lower 12 chambers, is a substantially flat plate member affording a rectangular unit consisting of sides 40a-40b and ends 40c-40d to correspond to the area defined by the rectangular configurations of the upper 11 and lower 12 chambers. A pair of seal members 41a-41b are provided to overly and underly the formed baffle plate 13

Arranged transversely across the central area of baffle plate 13 is an upwardly extending baffle member having smoothly contoured sides 42a–42b and smoothly contoured, sloping ends 42c–42d all of which terminate in an upper surface 42e in confronting relation to the inlet 14 of the chamber 11. It should be noted that this centrally arranged baffle plate 13 provides two flow apertures 13a–13b on the respective ends thereof to permit fluid to flow into the lower chamber after the initial velocity decreasing baffling effect. Flow of fluid into the chamber 11 is central of the chamber 11 to cascade against the uppermost surface 42e of the baffle 42 and thereafter downward upon the sides 42a–42b and end sections 42c–42d to exit one of apertures 13a–13b. Entering fluid is initially baffled to reduce velocity effects and stimulate gas separation prior to discharge into the lower chamber 12 through aforementioned openings 13a–13b in plate 13 where baffling and resultant pulse reduction and gas separation takes place.

Control for operation of the unit 10 to determine true flow rates is totally controlled through the microprocessor unit with directions of operation provided through the key board. As previously stated, the probes are scanned in successive approximate or sequential succession to accommodate for level oscillation. The milk essentially collects in chamber 12 outside of chamber 21 as controlled by the orifice 23. Milk flowing through orifice 23 does so in a thin, vertically oriented stream such that, in normal flow, the lower of probes 25-33 will be wetted and certain of the upper probes may or may not be wetted. The scanning technique will read the uppermost probe which is so wetted by the stream. Data returned from the probe scanning obviously reflects the level within the compartment 21 and the program utilized will correct and adjust for beginning and ending of the milking of any one animal to arrive at flow rate and total flow. The program takes into consideration the formation of the V-shaped orifice 23 as well as the size of the outlet 24 to arrive at such flow rate. This will be provided at the display in the desired unit quantities. It should be noted that the system includes a battery pack for remote useage of the unit in other than parlor conditions. Vacuum drive and other drive controls may similarly be programmed and various alternative operational methods such as slow or low flow conditions and attendant alert are programmable into the control system.

It should be obvious that with applicants' device milk is introduced generally centrally of an upper chamber to be confronted by a first baffle which reduces pulsating velocity effect and stimulates gas separation of entering milk. It should also be noted that the now separated gas exists the unit through the measuring chamber and as it passes therethrough it serpentines the probes for drying thereof and likewise dries the inner walls of such chamber. This drying motion substantially eliminates conductivity misreadings which could result from the conductive fluid on the walls or between probes.

The reduced turbulent flow milk is then delivered to the lower chamber 12 where additional baffling and separation of the milk and accummulating foam takes place with delivery of both milk and foam being through the discharge conduit 24 at the bottom of the unit 10. Of particular concern of milk flow through the unit is that measurement is taken downstream from the inlet and downstream from the turbulent flow, gas separation area with final introduction of the milk into the measuring chamber being through a particularly shaped, knife edged, vertical passage or orifice. The design of the orifice is mathematically calculated so as to obtain the most accurate flow rate reading from the pre-programmed micro processor system.

As illustrated in the various views, without numeral indication, all interior corners of the unit are rounded or radiused to afford an easily cleanable unit and the particular design of the elements of the unit affords ease of assembly and dis-assembly for cleaning while positively insuring sealing of the same together during flow and metering operations.

It should be obvious that applicants have provided a new and unique metering device incorporating a downstream, from an orifice, measurement technique for fluid to be measured with baffling techniques being provided in the unit to reduce turbulent and pulsating flow of the delivered fluid while also achieving gas separation to provide an efficient and true flow rate analysis.

What is claimed is:

1. A metering device for determining flow rates and total flow of fluids having a pulsating flow such as milk delivered from a milking machine, said device including;
   a. a fluid housing having a fluid inlet and a fluid outlet;
   b. a baffle plate extending transversely across the interior of said housing dividing the same into an upper and a lower chamber and providing at least a pair of flow apertures at respective ends thereof;
   c. said inlet communicating with said upper chamber for delivery of fluid thereto;
   d. a measuring compartment communicating with said lower chamber and receiving fluid therefrom and arranged and constructed to deliver fluid to said fluid outlet;
   e. said measuring compartment communicating with said lower chamber and receiving fluid therefrom through a generally vertically arranged, upwardly tapered orifice;
   f. a plurality of electrically conductive probes arranged within said measuring compartment in vertically disposed placement, a first of such probes being arranged adjacent to said fluid outlet;
   g. means for electrically determining conductivity between said first of such probes and the other of such probes as provided by the level of fluid within said measuring compartment; and,
   h. means for converting said electrically conductive readings between said probes to a visual readout correlating to the flow of fluid through said measuring compartment.

2. The metering device as set forth in claim 1 and said baffle plate including an upwardly directed baffle member arranged and constructed to receive fluid flow from said inlet directly thereagainst.

3. The metering device as set forth in claim 2 and said baffle member including a pair of smoothly contoured, inwardly and upwardly directed sides and a pair of smoothly contoured, inwardly and upwardly directed ends.

4. The metering device as set forth in claim 3 and said baffle plate providing flow apertures adjacent said ends of said upwardly directed baffle member for delivery of fluid therethrough into said lower housing chamber.

5. The metering device as set forth in claim 1 and the lower surface of said upper chamber and the upper surface of said lower chamber including generally planar surface; and,
   a. said baffle plate comprising a generally planar pair of surfaces;
   b. gasket means interposed between said planar surfaces of said upper and lower chambers and said baffle plate planar surfaces; and,
   c. quick release means for clamping said upper and lower chamber housings against said gasket means and said baffle plate surfaces to sealingly close said housing.

6. The metering device as set forth in claim 5 and said quick release clamping means including spring clip means.

7. The metering device as set forth in claim 5 and said quick release clamping means including:
   a. pairs of opposed ears arranged respectively on the uppermost surface of said upper and said lower planar surfaces; and,
   b. spring clip means arranged and constructed to be received about each of said pair of ears and exert clamping force thereagainst.

8. The metering device as set forth in claim 1 and a plurality of vertically arranged baffle members arranged in said lower chamber intermediate said flow apertures and said measuring compartment for continued baffling of fluid received from said upper chamber prior to entrance into said measuring compartment, said baffling members reducing turbulence of flow of fluid and separating gas from the fluid.

9. The metering device as set forth in claim 8 and said vertically arranged baffling members having an uppermost end terminating below the uppermost surface of said lower housing to provide a gas separation area within said lower chamber.

10. The metering device as set forth in claim 9 and said measuring compartment communicating with said gas separation area to receive gas therefrom for discharge therethrough to said fluid outlet.

11. The metering device as set forth in claim 10 and said measuring compartment being arranged within said lower chamber.

12. The metering device a set forth in claim 1 and said upwardly tapered orifice of said measuring compartment providing a knife edge on corresponding edges thereof.

13. The metering device as set forth in claim 1 and said means for determining electrical conductivity between said probes including means for successive approximation scanning of the same.

14. The metering device as set forth in claim 1 and said means for determining electrical conductivity between said probes including means for sequentially scanning of the same.

15. The metering device as set forth in claim 1 and said plurality of probes being arranged in staggered vertical relation to substantially reduce the occurrence of liquid spanning between probes when the level of fluid drops.

16. The metering device as set forth in claim 1 and means for determining a slow and a no flow rate of fluid flow and controlling the metering device operation in response thereto.

* * * * *